(12) United States Patent
Tsai et al.

(10) Patent No.: US 6,238,607 B1
(45) Date of Patent: *May 29, 2001

(54) HIGHLY ORIENTED FLUOROPOLYMER FILMS

(75) Inventors: Mingliang Lawrence Tsai, Holmdel; Yash Pal Khanna, Morristown; Joseph Edgar Mackey, East Hanover, all of NJ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/216,427

(22) Filed: Dec. 18, 1998

Related U.S. Application Data

(62) Division of application No. 08/690,712, filed on Jul. 31, 1996, now Pat. No. 5,874,035
(60) Provisional application No. 60/020,497, filed on Jun. 20, 1996.

(51) Int. Cl.[7] ............................ B32B 31/00; B32B 31/16; B32B 31/30
(52) U.S. Cl. ................................ 264/173.15; 264/173.12; 264/173.13; 264/173.14; 264/173.16; 264/288.4; 264/290.2; 428/421
(58) Field of Search ..................................... 428/422, 421, 428/520, 523, 522, 910; 156/308.2; 264/280, 289.3, 290.2, 288.4, 173.12, 173.13, 173.14, 173.15, 173.16

(56) References Cited

U.S. PATENT DOCUMENTS

| | | | |
|---|---|---|---|
| 4,677,017 | 6/1987 | Deantonis et al. | 428/214 |
| 5,139,878 | 8/1992 | Kim et al. | 428/421 |
| 5,945,221 | * 8/1999 | Tsai et al. | 428/412 |

* cited by examiner

*Primary Examiner*—Vivian Chen
(74) *Attorney, Agent, or Firm*—Roger H. Criss

(57) ABSTRACT

A method of producing highly oriented multilayer films comprising laminating films having at least one layer of a fluoropolymer, at least one layer of a polyolefin homopolymer or copolymer and an intermediate adhesive layer of a polyolefin having at least one functional moiety of an unsaturated carboxylic acid or anhydride thereof. With this structure the polyolefin layer allows the fluoropolymer layer to be stretched up to ten times its original length. Such a high orientation ratio for the fluoropolymer film increases the mechanical strength, toughness, and water vapor barrier properties of the film while using a thinner gauge fluoropolymer film.

3 Claims, No Drawings

HIGHLY ORIENTED FLUOROPOLYMER FILMS

This application claims the benefit of provisional application Ser. No. 60/020,497, filed on Jun. 20, 1996, which is incorporated herein by reference, and this application is a divisional of U.S. Ser. No. 08/690,712, filed Jul. 31, 1996, U.S. Pat. No. 5,874,035.

BACKGROUND OF THE INVENTION

1. Field of the invention

The present invention relates to oriented multilayer films. More particularly, the invention pertains to coextruded or laminated films having at least one layer of a fluoropolymer such as poly(chlorotrifluoro ethylene) (PCTFE) homopolymer or copolymer, a layer of a polyolefin homopolymer or polyolefin containing copolymer and an intermediate adhesive layer of a polyolefin having at least one functional moiety of an unsaturated carboxylic acid and/or anhydride thereof.

2. Description of the Prior Art

It is well known in the art to produce oriented polymeric films. See, e.g. U.S. Pat. No. 4,011,874. However, such films tend to expand in the direction perpendicular to the direction of stretching.

It is also known in the art to produce single layer and multilayer fluoropolymer films. See, e.g. U.S. Pat. Nos. 4,677,017; 4,659,625 and 5,139,878, all of which are incorporated herein by reference. However, fluoropolymers are difficult to orient due to their unique crystallization properties. More particularly, PCTFE is exceptionally difficult to orient due to its extremely fast crystallization rate and thermally induced self-orientation. Its fast crystallization rate produces a highly crystalline structure that hinders orientation and actually prevents further orientation beyond a certain point. Its thermally induced self-orientation results in a film which, upon unconstrained heating, self extends in the machine or longitudinally stretched direction and shrinks in the transverse direction.

Most earlier attempts to stretch PCTFE films have failed either due to its high degree of film crystallinity, nonuniform crystallinity, self-orientation or a combination of these factors. Prior art studies of the orientation of PCTFE homopolymer report a limit of a three to four times orientation or stretch ratio in either the machine direction (MD) or transverse direction (TD). For example, U.S. Pat. No. 4,544,721 describes a substantially amorphous chlorotrifluoroethylene polymer monolayer film which is oriented at least 2.5 times its original length, but no more than five times in the MD. It also disclosed therein that attempts to stretch crystalline PCTFE result in films that contain holes or tears, or which are uneven in thickness. Other known attempts to stretch PCTFE homopolymer more than five times its unstretched length result in film fibrilation and ultimate breakage. See, e.g. U.S. Pat. No. 4,510,301 (orients film containing a copolymer of ethylene and chlorotrifluoroethylene).

It would be desirable to produce a much more highly oriented, dimensionally stable fluoropolymer film since as the higher the degree of attainable orientation is increased, the properties of mechanical strength, toughness, and water vapor barrier capability are significantly improved without increasing the film gauge. It would also be desirable to produce a multilayered film structure which is dimensionally stable and uniform across its entire width.

SUMMARY OF THE INVENTION

The invention provides a multilayer film which comprises at least one fluoropolymer layer and at least one polyolefin layer comprising at least one polyolefin homopolymer, polyolefin containing copolymer or blends thereof, attached to a surface of the fluoropolymer layer by an intermediate adhesive layer comprised of at least one polyolefin having at least one functional moiety of an unsaturated carboxylic acid or anhydride thereof, which film has been uniaxially stretched at least five times in one linear direction, and wherein each of the fluoropolymer layer, adhesive layer and polyolefin layer have a viscosity of less than or equal to about 10,000 Pascal seconds at a temperature in the range of from about 280° C. to about 400° C.

The invention also provides a method of producing an oriented, multilayer film which comprises coextruding at least one layer of a fluoropolymer, and at least one layer of a polyolefin homopolymer or a polyolefin containing copolymer attached to a surface of the fluoropolymer layer by a coextruded intermediate adhesive layer, which intermediate adhesive layer is comprised of a polyolefin having at least one functional moiety of an unsaturated carboxylic acid or anhydride, wherein said coextruding is conducted at a temperature of from about 280° C. to about 400° C.; casting the film and then stretching the film at least five times in either its longitudinal or transverse direction.

The invention further provides a method of producing an oriented, multilayer film which comprises laminating at least one layer of a fluoropolymer to the surface of a layer of a polyolefin homopolymer or a polyolefin containing copolymer by an intermediate adhesive layer, which intermediate adhesive layer is comprised of a polyolefin having at least one functional moiety of an unsaturated carboxylic acid anhydride and then stretching the film article at least five times in either its longitudinal or transverse direction.

The invention still further provides an article which comprises a thermoformed film of the above multilayered film.

The present invention achieves a highly oriented fluoropolymer containing film by producing a multilayer structure by either a coextrusion or a lamination process. Without the additional layers in the film structure, many fluoropolymers such as PCTFE can only be stretched to a maximum of five times its original length and usually only three times stretching. With this structure, the polyolefin layer allows the fluoropolymer containing layer to be stretched more than five times its original length, and usually up to ten times its original length.

It has been further found that when fluoropolymer films are coextruded with polyolefins and adhered with the above intermediate adhesive layer at a temperature range of from about 280° C. to about 400° C., a stable, uniform film is produced.

DETAILED DESCRIPTION OF THE PREFERRED EMBODIMENT

For purposes of this invention, the terms "orienting" and "stretching" shall be used interchangeably. As used herein, "copolymers" shall include polymers having two or more monomer components.

The fluoropolymer layer may be comprised of PCTFE homopolymers or copolymers or blends thereof as are well known in the art and are described in, for example, U.S. Pat. Nos. 4,510,301; 4,544,721; and 5,139,878 which are incorporated herein by reference. Of these, particularly preferred fluoropolymers suitable to form multilayer barrier films of the present invention include homopolymers and copolymers of chlorotrifluoroethylene and copolymers of ethylene-chlorotrifluoroethylene. Such copolymers may contain up to 10%, and preferably up to 8% by weight of other comonomers such as vinylidine fluoride and tetrafluoroethylene. Most preferred are chlorotrifluoroethylene homopolymers and copolymers of chlorotrifluoroethylene and vinylidine fluoride and/or tetrafluoroethylene. Such may also be purchased commercially as ACLON® resin from AliedSignal Inc. of Morristown, N.J.

Adjacent to the fluoropolymer layer is an adhesive layer, also referred to in the art as a "tie" layer, between each film layer. In accordance with the present invention, suitable adhesive polymers includes modified polyolefin compositions having at least one functional moiety selected from the group consisting of unsaturated polycarboxylic acids and anhydrides thereof Such unsaturated carboxylic acid and anhydrides include maleic acid and anhydride, fumaric acid and anhydride, crotonic acid and anhydride, citraconic acid and anhydride, itaconic acid an anhydride and the like. Of these, the most preferred is maleic anhydride. The modified polyolefins suitable for use in this invention include compositions described in U.S. Pat. Nos. 3,481,910; 3,480,580; 4,612,155 and 4,751,270 which are incorporated herein by reference. The preferred modified polyolefin composition comprises from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified polyolefin composition may also contain up to about 40 weight percent of thermoplastic elastomers and alkyl esters as described in U.S. Pat. No. 5,139,878, which is incorporated herein by reference.

Adjacent the adhesive layer is a polyolefin layer comprised of poly($\alpha$-olefins) and copolymers and blends thereof, wherein the $\alpha$-olefin monomers have from about 2 to about 10 and preferably from about 2 to about 6 carbon atoms. Non-limiting examples of polyolefins include polyethylenes, including ultralow, low, linear low, medium, high and ultrahigh density polyethylene; polypropylene; polybutylene; polybutene- 1; polypentene-1; poly-3-methylbutene-1; poly-4-methylpentene-1; polyhexene; copolymers of polyolefins; copolymers of olefins and other polymers such as polyvinyl chloride, polystyrene and polyurethane, etc., and mixtures of these. Of these, the preferred polyolefins are polyethylene and polypropylene with polypropylene being most preferred.

Although each layer of the multilayer film structure may have a different thickness, the thickness of each of the fluoropolymer and polyolefin layers of the films in the post-stretched multilayer films structure is preferably from about 0.05 mils (1.3 $\mu$m) to about 100 mils (2540 $\mu$m), and more preferably from about 0.05 mils (1.3 $\mu$m) to about 50 mils (1270 $\mu$m). The thickness of the post-stretched adhesive layer may vary, but is generally in the range of from about 0.02 mils to about 12 mils (305 $\mu$m), preferably from about 0.05 mils (1.3 $\mu$m) to about 1.0 mils (25 $\mu$m), and most preferably from about 0.1 mils (25 $\mu$m) to about 0.8 mils (20 $\mu$m). While such thicknesses are preferred as providing a readily flexible film, it is to be understood that other film thicknesses may be produced to satisfy a particular need and yet fall within the scope of the present invention, such thicknesses which are contemplated include plates, thick films, and sheets which are not readily flexible at room temperature (approx. 20° C.).

In the preferred embodiment, each of the fluoropolymer layer, adhesive layer and polyolefin layer have on average no embedded particles having a diameter of greater than about 800 $\mu$m, no more than about 22 particles having a diameter of from about 400 to about 800 $\mu$m, no more than about 215 particles having a diameter of from about 200 to about 400 $\mu$m and no more than about 538 particles having a diameter of from about 100 to about 200 $\mu$m per square meter of film and wherein each of the fluoropolymer layer, adhesive layer and polyolefin layer have on average no more than about 0.36 embedded bubbles having a diameter of greater than about 3100 $\mu$m, no more than about 22 bubbles having a diameter of from about 1500 to about 3100 $\mu$m, and no more than about 161 bubbles having a diameter of less than about 1500 $\mu$m per square meter of film. This allows for an extremely clear film having less likelihood of breaking or tearing. Each of the fluoropolymer layer, adhesive layer and polyolefin layer materials have a melt viscosity of less than or equal to about 10,000, preferably from about 3,000 to about 10,000 Pascal seconds at a temperature in the range of from about 280° C. to about 400° C., and preferably from about 285° C. to about 370° C.

These may be determined by using a Systronics Eagle Automatic Inspection System manufactured by Systronics, Inc.

The multilayer films of the present invention can have a variety of structures so long as there is an adhesive layer between each polymer layer. A typical film structure includes a three-layer structure, which comprises a thermoplastic polyolefin layer, an adhesive layer and a fluoropolymer layer. Another typical film structure is a five-layer structure, which comprises a polyolefin layer, an adhesive layer, a fluoropolymer layer, an adhesive layer and a polyolefin layer. These are only two of many possible combinations of multilayer film structures, and any variation of the order and thickness of the layers of the fluoropolymer and polyolefin layer can be made.

The multilayer films of this invention may be produced by conventional methods useful in producing multilayer films, including coextrusion and extension lamination techniques. Suitable coextrusion techniques are described in U.S. Pat. Nos. 5,139,878 and 4,677,017 except coextrusion in this invention is conducted at from about 280° C. to about 400° C., preferably from about 285° C. to about 370° C. If coextrusion is performed at a higher temperature, the film polymers tend to degrade significantly and lose their film properties. If coextrusion is done at a lower temperature, the film has a non-uniform, hazy pattern indicative of melt fracture. Coextrusion techniques include methods which include the use of a feed block with a standard die, a multimanifold die such as a circular die, as well as a multimanifold die such as used in forming multilayer films for forming flat cast films and cast sheets.

One advantage of coextruded films is the formation of a multilayer film in a one process step by combining molten layers of each of the film layers of fluoropolymer, tie layer composition, and polyolefin, as well as optionally more film layers, into a unitary film structure. In order to produce a multilayer film by a coextrusion process, it is necessary that the constituents used to form each of the individual films be compatible with the film extrusion process. The term "compatible" in this respect means that the film-forming compositions used to form the films have melt properties which are sufficiently similar so as to allow coextrusion. Melt properties of interest include, for example, melting points, melt flow indices, apparent viscosity, as well as melt stability. It is important that such compatibility be present to assure the production of a multilayer film having good adhesion and relatively uniform thickness across the width of the film being produced. As is known in the art, film-forming compositions which are not sufficiently compatible to be useful in a coextrusion process frequently produce films having poor interfacial lamination, poor physical properties as well as poor appearance.

One skilled in the art can readily weigh the above-noted compatibility in order to select polymers having desirable physical properties and determine the optimal combination of relative properties in adjacent layers without undue experimentation. If a coextrusion process is used, it is important that the constituents used to form the multilayer film be compatible within a relatively close temperature range in order to permit extrusion through a common die. It has been found that the variation of the quantity of the modified polyolefin within the tie layer composition provides an adhesive layer forming composition which is of sufficiently high melt viscosity, especially in the preferred range of compositions described above, to be particularly useful in a coextrusion process with the fluoropolymer film forming composition, and with a film forming composition.

Alternatively, the multilayer films of the present invention can be produced by lamination whereby a multilayer film structure is formed from pre-fabricated film plies. The basic methods used in film laminating techniques are fusion, wet combining, and heat reactivating. Fusion, which is a method of laminating two or more film plies using heat and pressure without the use of other adhesives can only be used where the films being laminated are comprised of polymers that readily form interfacial adhesion. Wet combining and heat reactivating are utilized in laminating incompatible films using adhesive materials.

Typically, laminating is done by positioning the individual layers of the inventive film on one another under conditions of sufficient heat and pressure to cause the layers to combine into a unitary film. Typically the fluoropolymer, adhesive, and polyolefin layers are positioned on one another, and the combination is passed through the nip of a pair of heated laminating rollers by techniques well known in the art such as those described in U.S. Pat. No. 3,355,347 which is incorporated herein by reference. Lamination heating may be done at temperatures ranging from about 120° C. to about 175° C., preferably from about 150° C. to about 175° C. at pressures ranging from about 5 psig (0.034 MPa) to about 100 psig (0.69 MPa) for from about 5 seconds to about 5 minutes, preferably from about 30 seconds to about 1 minute.

The multilayer film, whether comprising or three or more layer structure, may be stretched or oriented in any desired direction using methods well known to those skilled in the art. Examples of such methods include those set forth in U.S. Pat. No. 4,510,301. In such a stretching operation, the film may be stretched uniaxially in either the direction coincident with the direction of movement of the film being withdrawn from the casting roller, also referred to in the art as the "machine direction", or in as direction which is perpendicular to the machine direction, and referred to in the art as the "transverse direction", or biaxially in both the machine direction and the transverse direction. The multilayered film of the invention are particularly useful for forming thermoformed three dimensionally shaped articles such as blister packaging for pharmaceuticals. This may be done by forming the film around a suitable mold and heating in a method well known in the art.

We have unexpectedly found that the fluoropolymer films of the present invention have sufficient dimensional stability to be stretched at least five and preferably more than five times and more preferably from more than five times to about ten times in either the machine direction or the transverse direction or both.

Another noteworthy characteristic of the films of the present invention is that they exhibit improved tensile modulus, mechanical strength, and the most significantly of all, excellent barrier properties towards both water vapor and oxygen at 100% relative humidity after being stretched five or more times its original length uniaxially in either machine direction or transverse direction.

Water vapor transmission rate (WVTR) may be via the procedure set forth in ASTM F1249. In the preferred embodiment, the multilayered film according to this invention has a WVTR of from about 0.001 to about 0.05 gm/100 in$^2$/day per mil thickness of PCTFE, preferably from about 0.002 to about 0.02 gm/100 in$^2$/day per mil thickness of PCTFE, and more preferably from about 0.002 to about 0.01 gm/100 in$^2$/day per mil thickness of PCTFE. For example, a three layered film having a PCTFE/adhesive layer/ polyolefin layer structure which is oriented six times its original length in the machine direction possesses a WVTR of 0.0051 gm/100 in$^2$/day per mil thickness of PCTFE which is 200% better than the unoriented equivalent sample (WVTR 0.017 gm/100 in$^2$/day per mil thickness) and almost 100% better than an equivalent film sample stretched only three times its original length (0.0098 gm/100 in$^2$/day per mil thickness.

Oxygen transmission rate (OTR) may be via the procedure of ASTM D-3985 using an OX-TRAN 2/20 instrument manufactured by Modern Controls, Inc., operated at 73° F., 90% RH. In the preferred embodiment, the multilayered film according to this invention has an OTR of from about 0.1 to about 10 cc/100 in$^2$/day per mil thickness of PCTFE, preferably from about 0.5 to about 5 cc/100 in$^2$/day per mil thickness of PCTFE, and more preferably from about 0.5 to about 3 cc/100 in$^2$/day per mil thickness of PCTFE. The following non-limiting examples serve to illustrate the invention.

EXAMPLES

The operation of the laboratory film stretcher employed in all of the following examples is based on the movement of two draw bars at right angles to each other upon hydraulically driven rods. These pairs of draw bars, to which the four edges of a film specimen are attached, form the two axes at right angles to each other along which a specimen is stretched in any desired stretch ratio. Films can be stretched in one or both directions independently or in both directions simultaneously. The stretching may be done at any selected constant rate adjustable from 0.51 to 50.8 cm per second or at any constant force from zero to 11.3 kg per inch of edge before stretching. Nominal sample size before stretching is 10 cm by 10 cm between grips for stretching under 4 times original size. For stretching between 4 times and 7 times original size, the sample size is 6 cm×6 cm. Specimens may be heated in a controlled manner during the stretching cycle, similar to the commercial tenter oven. The following examples employed a constant stretch rate of 25.3 cm per second and a stretch temperature at 90–100° C. with six seconds pre-heating at a temperature within the same range.

Example 1

PCTFE homopolymer (HP)(390,000 M.W., density: 2.11 gm/cc; melting temperature: 211° C.; Zero Strength Test (ASTM D1430): 128, manufactured by AlliedSignal Inc. under the tradename Aclon® HP 128), was heated for four hours at 121° C. for drying, and then extruded through a 3.2 cm (1¼") diameter Killion single screw extruder (L/D= 2411) equipped with three heating zones and two adapters.

The extruder temperature profile was set at 277° C., 282° C., and 288° C. for the zones 1–3, and the adapters were maintained at 288° C. The melt temperature was measured at 286° C. After passing the extrudate through a coextrusion film die maintained at 282° C., it was cast on a roller maintained at 38° C., followed by a cooling roller set at 38° C. The resultant film had a thickness of 25 μm although other films with various thicknesses up to 150 μm were also made. Immediately after casting, the films were stretched off-line in a T. M. Long laboratory stretcher set at 100° C. Cast film samples were cut to either 10 cm×10 cm or 6 cm×6 cm, depending on the intended stretching ratio. These film samples were then loaded into the laboratory stretcher equipped with grips along all four edges. After six seconds of preheating, the samples were then stretched to a desired stretch ratio, which was preset on the draw bar in the stretcher before the experiment. Films so obtained were then tested for various mechanical and physical properties as illustrated in Tables 1 and 2.

In all attempts to stretch monolayer PCTFE homopolymer greater than three times its unstretched length, the film always fibrilated and ultimately broke.

Example 2

A five layer laminate was coextruded using the PCTFE HP of Example 1, a poly(propylene) copolymer with polyethylene (melting temperature: 148° C.; melt flow rate MRF (ASTM D1238): 1.9 gm/10 min. at 230° C.; 3.2% ethylene content, manufactured by Shell Chemical Co. under the tradename 6E20), and a maleic anhydride modified polyolefin tie resin (density: 0.88 gm/cc melt index: 1.0 gm/10 min. at 190° C., manufactured by Mitsui Petrochemical Industries, Ltd. under the tradename "Admer") to make the following structure: poly(propylene)/tie resin/PCTFE HP/tie resin/poly(propylene).

Poly(propylene) copolymer was extruded through a 3.8 cm (1½") diameter Killion single screw extruder (L/D=24/1) equipped with three heating zones and two adapters. The extruder temperature profiles were set at 238° C., 249° C., 260° C. for the zone 1–3 and the adapters were maintained at 260° C. The melt temperature was 256° C. The maleic anhydride modified tie resin was extruded through a 3.2 cm (1¼") diameter Killion single screw extruder equipped with four heating zones and two adapters. The extruder temperature profiles were set at 238° C., 249° C., 260° C., 266° C. for the zone 1–4 and the adapters were maintained at 266° C. The resulting melt temperature was 263° C. The fluoropolymer was extruded following the same procedures described in Example 1.

The five layer extrudate, after passing through a coextrusion multilayer film die maintained at 282° C., was then cast on a roller kept at 38° C., followed by a cooling roll set at 38° C. The resultant film had a thickness of 25 μm although other films with various thicknesses up to 233 μm were also made. Immediately after the casting the films were stretched according to the method set forth in Example 1. The post-stretching layer thickness of the PCTFE homopolymer layer is about 38% of the total thickness, while the poly (propylene) layers and the tie layers consist of the remaining 62% of the total post-stretching thickness. In order to make direct comparison in the test properties, the PCTFE homopolymer layer was then carefully separated from the other layers in the multilayer film without any distortion or dimensional change.

This example illustrates that the PCTFE film, when coextruded with the tie and polypropylene layers can be stretched more than five times uniaxially in either machine direction (MD) or transverse direction (TD) with great ease without film breakage. The tensile modulus of the PCTFE film, when stretched more than five times its original length, is significantly higher than its counterparts as shown in Table I. As shown in Table II, the WVTR for PCTFE films oriented six times their original length in the MD was 0.0051 gm/100 in$^2$/day per mil thickness of PCTFE, which is 200% better than the unoriented sample and almost 100% better than the PC TFE film sample stretched only three times its original length.

TABLE 1

MECHANICAL PROPERTIES OF ORIENTED PCTFE HOMOPOLYMER

| SAMPLE | TENSILE MODULUS[1], MPa (psi) | DEGREE OF CRYSTAL-LINITY[2] (%) | EXAMPLE |
|---|---|---|---|
| Cast Monolayer PCTFE | 1054.17 × 10$^6$ (153,000) | 36.3 | 1 |
| Cast Five-Layer PCTFE | 1067.95 × 10$^6$ (155,000) | 38.0 | 2 |
| 2X MD | 1371.11 × 10$^6$ (199,000) | 42.4 | 1 and 2 |
| 3X MD | 1722.5 × 10$^6$ (250,000) | 43.1 | 1 and 2 |
| 4X MD | 1860.3 × 10$^6$ (270,000) | 45.1 | 2 |
| 5X MD | 2411.5 × 10$^6$ (350,000) | 45.1 | 2 |
| 5X MD | 2053.22 × 10$^6$ (298,000) | 45.6 | 2 |
| 6X MD | 2618.2 × 10$^6$ (380,000) | 46.0 | 2 |
| 6X MD | 2259.92 × 10$^6$ (328,000) | 45.5 | 2 |
| 7X MD | 2232.36 × 10$^6$ (324,000) | 47.2 | 2 |

[1]Tensile modulus in the direction stretched. For cast film samples, tensile modulus was measured in the machine direction (MD) using ASTM D-882.
[2]Degree of crystallinity determined by Differential Scanning Calorimetry (DSC). DSC scans were obtained on a TA 9900 Automated DSC unit. A 10.0 ± 0.2 mg sample was crimped in an aluminum pan and heated at a rate of 50° C./min. in an argon atmosphere. A DSC crystalline index was calculated from the ratio of the corrected heat of melting, $\Delta H_m$, and the heat of fusion, $\Delta H_m$ = 43 J/g of a 100% crystalline PCTFE.

TABLE 2

BARRIER PROPERTIES OF ORIENTED PCTFE HOMOPOLYMER

| SAMPLE | WVTR[3], gm mil/100 in$^2$/day at 100° F., 100% RH | OTR[3], cc mil/100 in$^2$/day at 73° F., 90% RH | EXAMPLE |
|---|---|---|---|
| Cast PCTFE Homopolymer (control) | 0.017 | 4.7 | 1 and 2 |
| 2X TD | 0.0114 | 3.8 | 1 and 2 |
| 3X TD | 0.0098 | 3.2 | 1 and 2 |
| 6X TD | 0.0051 | 2.7 | 2 |

[3]Both WVTR and OTR were measured in a MOCON instrument according to ASTM Test Method F1249, the results of which are based on per mil thickness of PCTFE.

Thus it can be seen that the uniaxial orientability of PCTFE film can be increased to attain seven times in either the MD or TD through its coextrusion with polyolefins. As illustrated in Table I, not only the tensile modulus, but also the degree of crystallinity of the coextruded PCTFE films significantly improved. The degree of crystallinity of all films ranged from 36% to 49%, a significant increase as one increases the orientation ratio. As illustrated in Table 2, the barrier properties improve significantly as the stretch ratio increases. More specifically, the WVTR for a six-time MD oriented film sample, at (0.0051 gm/100 in$^2$/day per mil thickness of PCTFE) was 30% lower than the WVTR for the unoriented control film (0.017 gm/100 in$^2$/day per mil thickness of PCTFE). This level of moisture barrier is the best ever known for a thermoplastic material, approaching the barrier properties of the metal and glass, which are considered impermeable. The OTR was also dramatically reduced by about 57%, from 4.7 cc/100 in$^2$/day per mil thickness of PCTFE for the unoriented film sample to 2.7 cc/100 in$^2$/day per mil thickness of PCTFE at 55° C. and 90% RH for the sample oriented six times it original length.

What is claimed is:

1. A method of producing an oriented, multilayer film which comprises laminating at least one layer of a fluoropolymer to the surface of a layer of a polyolefin layer comprising a polyolefin homopolymer or a polyolefin containing copolymer by an intermediate adhesive layer, which intermediate adhesive layer is comprised of a polyolefin having at least one functional moiety of an unsaturated carboxylic acid anhydride and then stretching the film article at least five times in either its longitudinal or transverse direction; wherein each of the fluoropolymer layer, adhesive layer and polyolefin layer have a viscosity of less than or equal to about 10,000 Pascal seconds at a temperature in the range of from about 280° C. to about 400° C.; and wherein each of the fluoropolymer layer, adhesive layer and polyolefin layer have on average no embedded particles having a diameter of greater than about 800 µm, no more than about 22 particles having a diameter of from about 400 to about 800 µm, no more than about 215 particles having a diameter of from about 200 to about 400 µm and no more than about 538 particles having a diameter of from about 100 to about 200 µm per square meter of film.

2. The method of claim 1 further comprising laminating an additional polyolefin layer comprised of a polyolefin homopolymer or a polyolefin containing copolymer to another surface of the fluoropolymer layer by an additional intermediate adhesive layer which is comprised of a polyolefin having at least one functional moiety of an unsaturated carboxylic acid anhydride; wherein each of the additional adhesive layer and additional polyolefin layer have a viscosity of less than or equal to about 10.000 Pascal seconds at a temperature in the range of from about 280° C. to about 400° C.; and wherein each of the additional adhesive layer and additional polyolefin layer have on average no embedded particles having a diameter of greater than about 800 µm, no more than about 22 particles having a diameter of from about 400 to about 800 µm, no more than about 215 particles having a diameter of from about 200 to about 400 µm and no more than about 538 particles having a diameter of from about 100 to about 200 µm per square meter of film.

3. The method of claim 1 further comprising laminating an additional layer of fluoropolymer to another surface of the polyolefin layer by an additional intermediate adhesive layer which is comprised of a polyolefin having at least one functional moiety of an unsaturated carboxylic acid anhydride; wherein each of the additional fluoropolymer layer and additional adhesive layer have a viscosity of less than or equal to about 10,000 Pascal seconds at a temperature in the range of from about 280° C. to about 400° C.; and wherein each of the additional fluoropolymer lager and the additional adhesive layer have on average no embedded particles having a diameter of greater than about 800 µm, no more than about 22 particles having a diameter of from about 400 to about 800 µm, no more than about 215 particles having a diameter of from about 200 to about 400 µm and no more than about 538 particles having a diameter of from about 100 to about 200 µm per square meter of film.

* * * * *